(12) United States Patent
Wei et al.

(10) Patent No.: US 12,065,717 B1
(45) Date of Patent: Aug. 20, 2024

(54) PREPARATION PROCESS OF $Ti_3AlC_2$ CERAMIC PHASE-TOUGHENED MOLYBDENUM ALLOY

(71) Applicant: Henan University of Science and Technology, Luoyang (CN)

(72) Inventors: Shizhong Wei, Luoyang (CN); Lu Yang, Luoyang (CN); Xinyuan Zheng, Luoyang (CN); Xiran Wang, Luoyang (CN); Dong Liang, Luoyang (CN); Yang Zhao, Luoyang (CN)

(73) Assignee: HENAN UNIVERSITY OF SCIENCE AND TECHNOLOGY, Luoyang (CN)

( * ) Notice: Subject to any disclaimer, the term of this patent is extended or adjusted under 35 U.S.C. 154(b) by 0 days.

(21) Appl. No.: 18/603,430

(22) Filed: Mar. 13, 2024

(30) Foreign Application Priority Data

Mar. 14, 2023 (CN) .......................... 202310238973.8

(51) Int. Cl.
  *C22C 1/05* (2023.01)
  *B22F 3/15* (2006.01)
  (Continued)

(52) U.S. Cl.
  CPC ................ *C22C 1/051* (2013.01); *B22F 3/15* (2013.01); *C22C 1/045* (2013.01); *C22C 27/04* (2013.01); *C22C 32/0052* (2013.01)

(58) Field of Classification Search
  CPC .................................................... C22C 1/051
  See application file for complete search history.

(56) References Cited

U.S. PATENT DOCUMENTS 7,572,313 B2 * 8/2009 Palanisamy ............... F01D 5/28
                                                      75/247
8,747,515 B2 * 6/2014 Duz ........................ C22C 1/047
                                                      419/15
(Continued)

FOREIGN PATENT DOCUMENTS

CN      102174679 A     9/2011
CN      113667854 A     11/2021
(Continued)

OTHER PUBLICATIONS

B Lynn Ferguson and Randall German, "Powder Shaping and Consolidation Technologies," ASM Handbook, vol. 7 (1998), pp. 313-320 (Year: 1998).*

(Continued)

*Primary Examiner* — Christopher S Kessler
(74) *Attorney, Agent, or Firm* — J.C. PATENTS

(57) ABSTRACT

The present disclosure relates to a preparation process of a $Ti_3AlC_2$ ceramic phase-toughened molybdenum alloy. The preparation process includes: mixing $MoO_2$ and $Ti_3AlC_2$ powders, sieving to obtain a mixed powder, and then conducting high-temperature hydrogen reduction; mixing a resulting reduced powder with a coarse-grained Mo powder to obtain a precursor powder; putting the precursor powder into a cladding material to allow hot-pressed sintering; subjecting an obtained sintered molybdenum alloy to high-temperature treatment and thermoplastic processing in sequence; and annealing an obtained processed molybdenum alloy to obtain a high-strength and high-toughness molybdenum alloy. In the present disclosure, a $Ti_3AlC_2$-containing ultrafine powder prepared by reduction is mixed with the commercial coarse-grained molybdenum powder in a certain proportion to obtain the precursor powder. After the precursor powder is subjected to the hot-pressed sintering, (Continued)

the molybdenum alloy can achieve a higher density and finer grains.

20 Claims, 7 Drawing Sheets

(51) Int. Cl.
  *C22C 1/04* (2023.01)
  *C22C 1/051* (2023.01)
  *C22C 27/04* (2006.01)
  *C22C 32/00* (2006.01)

(56) References Cited

U.S. PATENT DOCUMENTS

| | | | | |
|---|---|---|---|---|
| 2009/0017332 A1* | 1/2009 | Kisi | ............... | C04B 35/58021 |
| | | | | 423/351 |
| 2010/0055492 A1* | 3/2010 | Barsoum | ............... | C04B 41/88 |
| | | | | 164/76.1 |
| 2015/0199952 A1* | 7/2015 | Amini | ............... | C04B 35/56 |
| | | | | 75/242 |

FOREIGN PATENT DOCUMENTS

| | | |
|---|---|---|
| CN | 113862540 A | 12/2021 |
| CN | 114164367 A | 3/2022 |

OTHER PUBLICATIONS

Machine translation of CN113667854A (Chinese document published on Nov. 19, 2021).*
ISA/CN; ISR and Written Opinion prepared for PCT/CN2023/088302; Applicant: Henan University of Science and Technology; Date mailed: Nov. 3, 2023.
ISA/CN; English translation of ISR and Written Opinion prepared for PCT/CN2023/088302; Applicant: Henan University of Science and Technology; Date mailed: Nov. 3, 2023.

* cited by examiner

PREPARATION PROCESS OF Ti$_3$AlC$_2$ CERAMIC PHASE-TOUGHENED MOLYBDENUM ALLOY

CROSS REFERENCE TO RELATED APPLICATION

This patent application claims the benefit and priority of Chinese Patent Application No. 202310238973.8, filed with the China National Intellectual Property Administration on Mar. 14, 2023, the disclosure of which is incorporated by reference herein in its entirety as part of the present application.

TECHNICAL FIELD

The present disclosure belongs to the technical field of powder metallurgy, and particularly relates to a preparation process of a Ti$_3$AlC$_2$ ceramic phase-toughened molybdenum alloy.

BACKGROUND

Molybdenum has high melting point, density, and elastic modulus, low linear thermal expansion coefficient, excellent wear resistance, as well as desirable electrical and thermal conductivity. Accordingly, molybdenum and alloys thereof exhibit broad application prospects as high-temperature-resistant structural materials and functional materials in various industrial fields such as metallurgy, machinery, chemical industry, nuclear energy, electronics, and aerospace.

In the high-temperature field, molybdenum alloys show irreplaceable advantages. Typical molybdenum alloy products include turbine engines in the aerospace industry, missiles in the military industry, and high-temperature components on fusion reactors and other equipment in the nuclear industry, as well as high-temperature nozzles on aircraft engines and molybdenum plugs in the metallurgical industry. The molybdenum plug is used to manufacture seamless tubes prepared from stainless steel, alloy steel, and high-temperature alloys, which require relatively strict high-temperature strength and hardness. Turbine engines and high-temperature nozzles require manufacturing materials that do not recrystallize at high temperatures and have excellent high-temperature strength and plasticity. High-temperature components on equipment such as fusion reactors have extremely high requirements for safety and reliability. This makes their manufacturing materials to not only have desirable radiation resistance, but also have excellent high-temperature structural stability, high-temperature strength, and plasticity. In view of this, the molybdenum alloys with high strength and plasticity represent a development trend of high-temperature molybdenum alloys with a high quality.

Traditional carbide-, oxide-, and rare earth-toughened molybdenum alloys have reached a bottleneck. A novel Ti$_3$AlC$_2$ ceramic crystal is in a layered hexagonal crystal system. The Ti$_3$AlC$_2$ ceramics have a bonding configuration for its unique crystal structure that combines various advantages of ceramic materials and metallic materials, including high melting point and damage tolerance, as well as desirable thermal stability, creep resistance, and oxidation resistance. These properties provide the possibility to further improve a performance of the molybdenum alloys.

SUMMARY

An objective of the present disclosure is to provide a preparation process of a Ti$_3$AlC$_2$ ceramic phase-toughened molybdenum alloy. In the present disclosure, a reduced Ti$_3$AlC$_2$-containing ceramic phase powder is mixed with a commercial coarse-grained molybdenum powder to obtain a precursor powder. After the precursor powder is subjected to hot-pressed sintering, the molybdenum alloy can achieve a higher density and finer grains. This preparation process can flexibly design a product shape and a product size to meet demands of different working conditions. The Ti$_3$AlC$_2$ ceramic material, as a doping phase, generates titanium-containing carbides and oxides in situ at high temperatures, increasing a recrystallization temperature of the molybdenum alloy by 600° C. Moreover, the plasticity and toughness of the molybdenum alloy are greatly enhanced without reducing the strength, thus breaking through a performance bottleneck of existing molybdenum alloys. The Ti$_3$AlC$_2$ ceramic phase-toughened molybdenum alloy has a density of not less than 99.5%. The molybdenum alloy also shows a recrystallization temperature of 1,600° C., a tensile strength of not less than 1,000 MPa, an elongation of not less than 50%, and a 1,400° C. compressive strength of not less than 240 MPa. Therefore, the molybdenum alloy exhibits broad application scenarios in high-temperature fields.

The present disclosure is specifically achieved through the following technical solutions: the present disclosure provides a preparation process of a Ti$_3$AlC$_2$ ceramic phase-toughened molybdenum alloy, including the following steps:

(1): subjecting a certain amount of a molybdenum dioxide (MoO$_2$) powder and a Ti$_3$AlC$_2$ powder that are weighed according to requirements of a final product to dry mixing for 12 h to 32 h using a dual-power mixer, and sieving to obtain a mixed powder for later use;

(2): placing the mixed powder prepared in step (1) into a molybdenum boat to allow high-temperature reduction under a reducing hydrogen atmosphere at 750° C. to 1,000° C. with a hydrogen flow rate of (12-20) m$^3$/h and a powder spreading height that is less than or equal to ⅘ of a volume of the molybdenum boat for 6 h to 24 h, and mixing a resulting reduced Ti$_3$AlC$_2$ ceramic phase-containing powder with a commercial coarse-grained Mo powder at a certain proportion in the dual-power mixer for 10 h to 20 h to obtain a precursor powder;

(3): selecting a suitable cladding material according to a size of the final product, and subjecting the cladding material to ultrasonic cleaning and preheating before filling with a powder;

(4): filling the cladding material treated in step (3) with a certain amount of the precursor powder obtained in step (2) while conducting vibration, sealing upper and lower parts of the cladding material, welding edges of the cladding material, and checking gas tightness;

(5): heating a precursor powder-filled cladding material in a muffle furnace to 500° C. to 600° C. to remove possible water of crystallization, and conducting high-temperature degassing for 8 h to 20 h using a vacuum evacuation system; scaling and welding an air extraction port of the cladding material by argon arc welding when a vacuum degree in the cladding material reaches $1\times10^{-3}$ Pa to $1\times10^{-5}$ Pa, and then conducting hot-pressed sintering to obtain a sintered molybdenum alloy;

(6): heating the sintered molybdenum alloy obtained in step (5) to a temperature of 1,200° C. to 1,600° C. and holding the temperature for 30 min to 60 min under a protective atmosphere with a flow rate of (5-15) m$^3$/h, and then conducting thermoplastic processing to obtain a molybdenum alloy billet; and (7): annealing the molybdenum alloy billet obtained in step (6) under a protective atmosphere to obtain a high-density and high-toughness molybdenum alloy.

Preferably, the $Ti_3AlC_2$ powder has a lamellar structure, a purity of not less than 99%, and a particle size of 2 μm to 10 μm, and the molybdenum dioxide powder has a particle size of 8 μm to 20 μm and an impurity potassium content of 5 ppm to 10 ppm in step (1); and the commercial coarse-grained Mo powder has a particle size of 3 μm to 8 μm in step (2).

Preferably, the ultrasonic cleaning is conducted at 30° C. to 60° C. for 30 min to 60 min; and the preheating refers to heating the cladding material in the muffle furnace at 500° C. to 600° C. for 1 h to 2 h, and then cooling with the muffle furnace in step (3).

Preferably, the vibration in step (4) is conducted at an amplitude of 3 mm to 5 mm and a vibration frequency of 280 times/min to 350 times/min for 15 min to 30 min.

Preferably, the hot-pressed sintering in step (5) is conducted at 1,300° C. to 1,900° C. for 4 h to 10 h; a microstructure of the sintered molybdenum alloy includes molybdenum grains and nano-$TiC_{0.67}$ particles that are evenly distributed in the sintered molybdenum alloy; and the molybdenum grains have a particle size of 5 μm to 20 μm, while the nano-$TiC_{0.67}$ particles have an average particle size of 50 nm to 200 nm.

Preferably, the thermoplastic processing in step (6) is one or a combination of two or more selected from the group consisting of rotary forging, rolling, extrusion, and drawing; and the thermoplastic processing has a cogging temperature of 1,300° C. to 1,600° C., a total number of passes of 2 to 6 times, a deformation in each pass of 20% to 30%, and a total deformation of greater than or equal to 70%.

Preferably, the annealing in step (7) is conducted at 900° C. to 1,600° C. for 40 min to 200 min.

Preferably, the protective atmosphere is a hydrogen atmosphere.

In the present disclosure, the $Ti_3AlC_2$ ceramic phase-toughened molybdenum alloy has a density of not less than 99.5% and a particle size of 1 μm to 8 μm. The molybdenum alloy also shows a room-temperature tensile strength of greater than 1,000 MPa, an elongation of greater than 50%, and a 1,400° C. compressive strength of greater than 240 MPa. Therefore, the molybdenum alloy exhibits broad application scenarios in high-temperature fields.

Compared with the prior art, the present disclosure has obvious advantages and beneficial effects, at least the following advantages:

(1) In the present disclosure, $Ti_3AlC_2$ particles with high melting point, hardness, and fracture toughness serve as a doping phase. An initial powder is reduced by hydrogen and then mixed with coarse grains in a certain proportion, followed by hot isostatic pressing (HIP) sintering. This process makes the molybdenum alloy denser and the grains finer. The hot-pressed sintering can make the powder uniform and more densified. Moreover, a particle size of the obtained final material can be designed by adjusting a dosage of the blended coarse-grained molybdenum powder to meet the demands of different working conditions.

(2) In the present disclosure, the doping phase $Ti_3AlC_2$ generates two-dimensional $TiC_{0.67}$ particles in situ at high temperatures. The $TiC_{0.67}$ particles produced by in-situ reaction decomposition are evenly distributed in a molybdenum matrix and have a large specific surface area and high surface energy. These properties can promote the densification of materials, thereby improving the mechanical properties such as yield strength and fracture toughness of molybdenum alloys. The $TiC_{0.67}$ particles generated by in-situ reaction have better thermal stability and are mainly distributed on grain boundaries, effectively hindering movement and deformation of the grain boundaries at high temperatures, and resulting in a more stable microstructure of the material at high temperatures. In this way, the molybdenum alloy has desirable high-temperature strength and high recrystallization temperature, thereby improving a performance of the molybdenum alloy in high-temperature scenarios and expanding an application scope of the molybdenum alloy.

(3) In the present disclosure, the thermoplastic processing can be conducted to further refine the grains and improve the density and performance of the molybdenum alloy. A microstructure of the high-strength and high-toughness molybdenum alloy obtained by the above process includes molybdenum grains and nano-$TiC_{0.67}$ particles that are evenly distributed inside the molybdenum grains. The molybdenum grains have an average width of 1 μm to 8 μm, while the nano-$TiC_{0.67}$ particles that are evenly distributed inside the molybdenum grains have an average particle size of 50 nm to 200 nm.

(4) In the present disclosure, the molybdenum alloy has excellent comprehensive properties. The molybdenum alloy also shows high density, desirable uniformity, and excellent performance; while the preparation process thereof is convenient and efficient. As a result, the molybdenum alloy can achieve extremely desirable application prospects in rare earth metallurgy, aerospace and other fields.

DETAILED DESCRIPTION OF THE EMBODIMENTS

Figure 1:
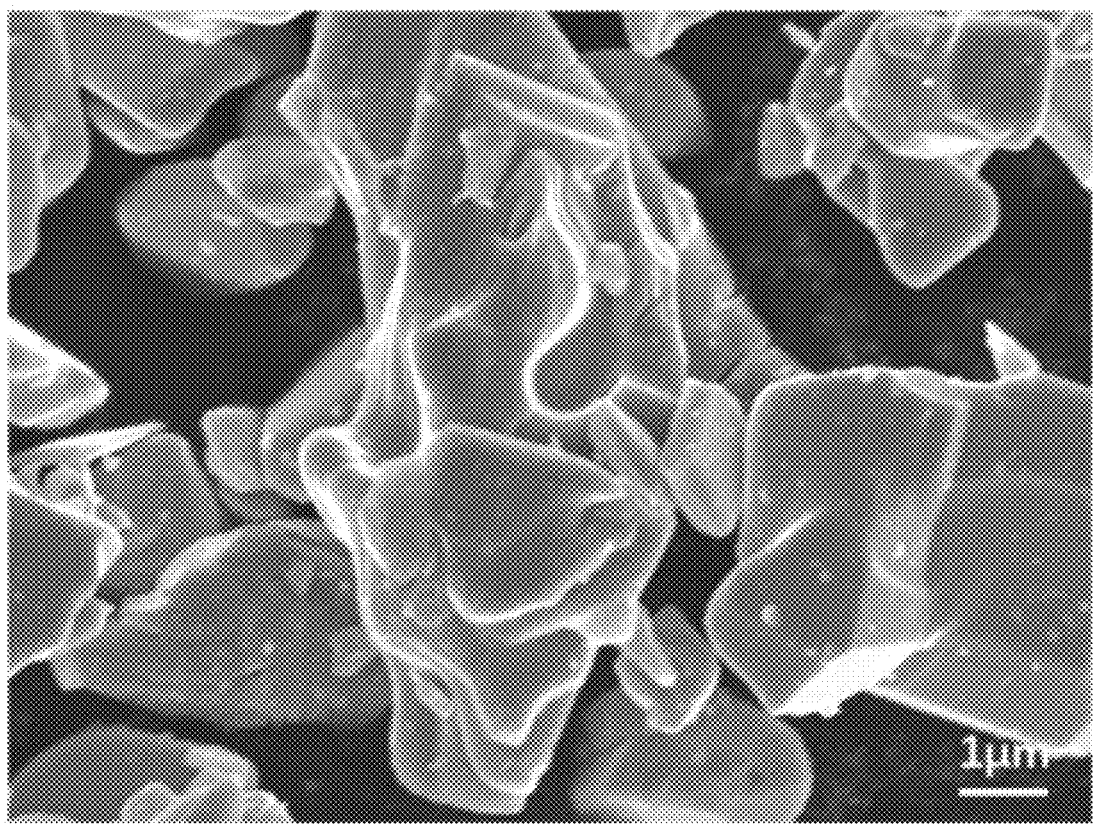
FIG. 1 shows an scanning electron microscopy (SEM) image of the precursor powder prepared in Example 1.

In order to make the objectives, technical solutions, and advantages of the embodiments of the present disclosure clearer, the technical solutions in the present disclosure are described clearly and completely below with reference to the accompanying drawings. Apparently, the described embodiments are some rather than all of the embodiments of the present disclosure. All other examples obtained by a person of ordinary skill in the art based on the examples of the present disclosure without creative efforts shall fall within the protection scope of the present disclosure.

The present disclosure provides a preparation process of a $Ti_3AlC_2$ ceramic phase-toughened molybdenum alloy, including the following steps:

(1): subjecting a certain amount of a molybdenum dioxide ($MoO_2$) powder and a $Ti_3AlC_2$ powder that are weighed according to requirements of a final product to dry mixing for 12 h to 32 h using a dual-power mixer, and sieving to obtain a mixed powder for later use;

(2): placing the mixed powder prepared in step (1) into a molybdenum boat to allow high-temperature reduction under a reducing hydrogen atmosphere at 750° C. to 1,000° C. with a hydrogen flow rate of (12-20) m³/h and a powder spreading height that is less than ⅘ of a volume of the molybdenum boat for 6 h to 24 h, and mixing a resulting reduced $Ti_3AlC_2$ ceramic phase-containing powder with a coarse-grained Mo powder in the dual-power mixer for 10 h to 20 h to obtain a precursor powder;

(3): selecting a suitable cladding material according to a size of the final product, and subjecting the cladding material to ultrasonic cleaning and preheating before filling with a powder; where the ultrasonic cleaning is conducted at 30° C. to 60° C. for 30 min to 60 min; and the preheating refers to heating the cladding material in the muffle furnace at 500° C. to 600° C. for 1 h to 2 h, and then cooling with the muffle furnace;

(4): filling the cladding material treated in step (3) with a certain amount of the precursor powder obtained in step (2) while conducting vibration at an amplitude of 3 mm to 5 mm and a vibration frequency of 280 times/min to 350 times/min for 15 min to 30 min, scaling upper and lower parts of the cladding material, welding edges of the cladding material, and checking gas tightness;

(5): heating a precursor powder-filled cladding material in a muffle furnace to 500° C. to 600° C. to remove possible water of crystallization, and conducting high-temperature degassing for 8 h to 20 h using a vacuum evacuation system; scaling and welding an air extraction port of the cladding material by argon arc welding when a vacuum degree in the cladding material reaches $1\times10^{-3}$ Pa to $1\times10^{-5}$ Pa, and then conducting hot-pressed sintering at 1,300° C. to 1,900° C. for 4 h to 10 h to obtain a sintered molybdenum alloy; where a microstructure of the sintered molybdenum alloy includes molybdenum grains and nano-$TiC_{0.67}$ particles that are evenly distributed in the sintered molybdenum alloy; and the molybdenum grains have a particle size of 5 μm to 20 μm, while the nano-$TiC_{0.67}$ particles have an average particle size of 50 nm to 200 nm;

(6): heating the sintered molybdenum alloy obtained in step (5) to a temperature of 1,200° C. to 1,600° C. and holding the temperature for 30 min to 60 min under a reducing atmosphere of hydrogen (with a flow rate of (5-15) m³/h, thus preventing molybdenum oxidation), and then conducting thermoplastic processing to obtain a molybdenum alloy billet; where the thermoplastic processing is one or a combination of two or more selected from the group consisting of rotary forging, rolling, extrusion, and drawing; and the thermoplastic processing has a total number of passes of 2 to 6 times, a deformation in each pass of 20% to 30%, and a total deformation of greater than or equal to 70%; and (7): annealing the molybdenum alloy billet obtained in step (6) at 900° C. to 1,600° C. for 40 min to 200 min under a reducing atmosphere of hydrogen with a flow rate of (5-15) m³/h to obtain a high-density and high-toughness molybdenum alloy.

In the present disclosure, layered $Ti_3AlC_2$ particles with high melting point, hardness, and fracture toughness serve as a doping phase. An initial powder is reduced by hydrogen and then mixed with coarse grains in a certain proportion, followed by hot isostatic pressing (HIP) sintering. Then, heat processing and heat treatment are conducted to obtain the high-density, high-strength, and high-toughness molybdenum alloy. The secondary phase $Ti_3AlC_2$ particles self-generate two-dimensional carbide $TiC_{0.67}$ in situ at high temperatures. The $TiC_{0.67}$ particles produced by in-situ reaction decomposition can be evenly distributed in the molybdenum matrix. The $TiC_{0.67}$ particles are smaller, have large specific surface area and high surface energy, and show better thermal stability. The secondary phases are evenly distributed, effectively hindering movement and deformation of the grain boundaries at high temperatures, and resulting in a more stable microstructure of the material at high temperatures. In this way, the molybdenum alloy has desirable high-temperature strength and high recrystallization temperature, thereby improving a performance of the molybdenum alloy in high-temperature scenarios and expanding an application scope of the molybdenum alloy. The result is a material with a density of not less than 99.5%. The molybdenum alloy also shows a recrystallization temperature of 1,600° C., a tensile strength of not less than 1,000 MPa, an elongation of not less than 50%, and a 1,400° C. compressive strength of not less than 240 MPa, thus comprehensively improving comprehensive mechanical properties of the molybdenum alloy.

A large number of experiments have demonstrated that mixing coarse and fine powders can inhibit the growth of the $Ti_3AlC_2$ secondary phase, and the fine $TiC_{0.67}$ particles generated by high-temperature decomposition are more distributed inside the grains, thereby providing mass points for further recrystallization and nucleation. The larger secondary phases are distributed on the grain boundaries, and rely on a special two-dimensional lamellar structure to improve an interface bonding force and enhance toughness of the molybdenum alloy.

Further, the $Ti_3AlC_2$ has a crystal structure of a hexagonal crystal lamellar structure, with a purity of not less than 99%, and a particle size of 2 μm to 10 μm, and the molybdenum dioxide powder has a particle size of 8 μm to 20 μm and an impurity potassium content of 5 ppm to 10 ppm in step (1). The commercial coarse-grained Mo powder has a particle size of 3 μm to 8 μm in step (2).

The technical solutions will be described in detail below with reference to specific examples:

Example 1

(1): 4,180 g of a molybdenum dioxide ($MoO_2$) powder and 120 g of a $Ti_3AlC_2$ powder according to requirements of a final product were subjected to dry mixing for 16 h using a dual-power mixer, and sieved by 300 mesh to obtain a mixed powder for later use;

(2): the mixed powder prepared in step (1) was placed into a molybdenum boat to allow high-temperature reduction under a reducing hydrogen atmosphere at 900° C. with a hydrogen flow rate of 15 m³/h and a powder spreading height that was ⅔ of a volume of the molybdenum boat for 18 h, and a resulting reduced powder was mixed with 1,700 g of a commercial 3 μm Mo powder in the dual-power mixer for 12 h to obtain a precursor powder;

(3): a suitable cladding material was selected according to a size of the final product, and the cladding material was subjected to ultrasonic cleaning and preheating before filling with a powder; where the ultrasonic cleaning was conducted at 30° C. for 30 min; and the preheating referred to heating the cladding material in the muffle furnace at 500° C. for 1 h, and then cooling with the muffle furnace;

(4): the cladding material treated in step (3) was filled with a certain amount of the precursor powder obtained in step (2) while conducting vibration at an amplitude of 3 mm and a vibration frequency of 320 times/min for 25 min, upper and lower parts of the cladding material were sealed, edges of the cladding material were welded, and gas tightness was checked;

(5): a precursor powder-filled cladding material was heated in a muffle furnace to 600° C. to remove possible water of crystallization, and high-temperature degassing was conducted for 16 h using a vacuum evacuation system; an air extraction port of the cladding material was scaled and welded by argon arc welding when a vacuum degree in the cladding material reached $1\times10^{-3}$ Pa, and then hot-pressed sintering was conducted at 1,600° C. for 4 h to obtain a sintered molybdenum alloy; where a microstructure of the sintered molybdenum alloy included molybdenum grains and nano-$TiC_{0.67}$ particles that were evenly distributed in the sintered molybdenum alloy; and the molybdenum grains had a particle size of 11 μm to 15 μm, while the nano-$TiC_{0.67}$ particles had an average particle size of 50 nm to 200 nm;

(6): the sintered molybdenum alloy obtained in step (5) was heated to a temperature of 1,450° C. and the temperature was held for 30 min under a reducing atmosphere of hydrogen with a flow rate of 8 m³/h, and then thermoplastic processing was conducted to obtain a molybdenum alloy billet; where the thermoplastic processing was rotary forging; and the thermoplastic processing had a total number of passes of 5 times, a deformation in each pass of 25%, and a total deformation of greater than or equal to 76.3%; and (7): the molybdenum alloy billet obtained poor step (6) was annealed at 1,300° C. for 40 min under a reducing atmosphere of hydrogen with a flow rate of 8 m³/h to obtain a high-density and high-toughness molybdenum alloy with a density of 99.8% and a grain size of 4 μm to 6 μm.

The high-strength and high-toughness molybdenum alloy prepared in this example had a recrystallization temperature of 1,600° C. The mechanical properties at room temperature were tested by an American INSTRON-5967 universal testing machine, while the high-temperature compressive strength was tested by an American Gleeble-1500D thermal simulation testing machine. The high-strength and high-toughness molybdenum alloy obtained in this example had a room-temperature tensile strength of 1,450 MPa, an elongation of 59.7%, and a high-temperature compressive strength of 248 MPa at 1,400° C., which were increased by 208%, 70.6%, and 106.6% compared to those of pure molybdenum metal, respectively.

FIG. 1 showed a SEM image of the precursor powder prepared in step (2) of this example, where the two-dimensional layered $Ti_3AlC_2$ was evenly mixed with large and small particles of molybdenum powder.

Figure 2:
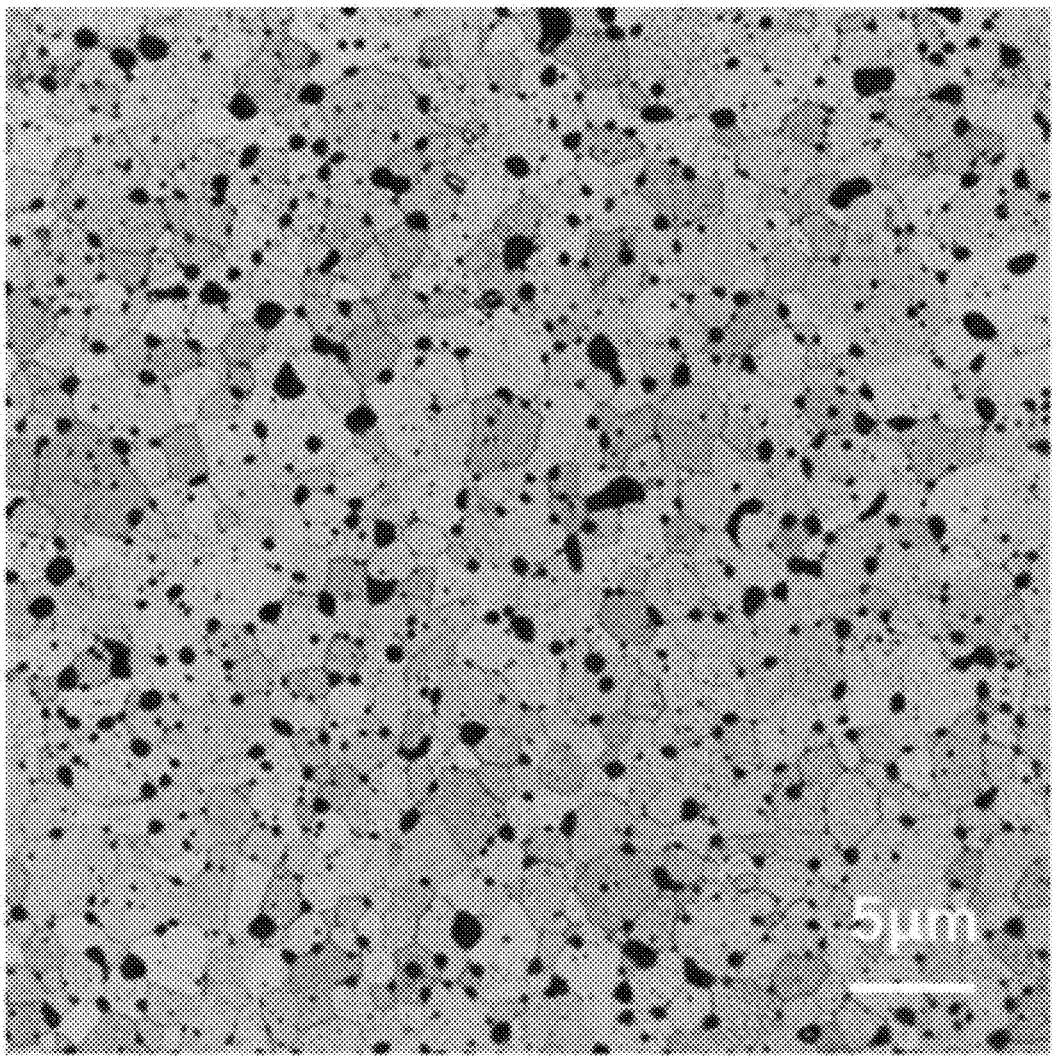
FIG. 2 shows a metallographic image of the high-strength and high-toughness molybdenum alloy prepared in Example 1 under an optical microscope.

FIG. 2 showed structure morphology of the high-strength and high-toughness molybdenum alloy prepared in this example (a metallographic image under optical microscope). The molybdenum grains had an average particle size of 4 μm to 6 μm; larger secondary phases were evenly distributed at the grain boundaries, while finer secondary phases were evenly distributed inside the grains.

Example 2

(1): 1,335 g of a molybdenum dioxide ($MoO_2$) powder and 90 g of a $Ti_3AlC_2$ powder according to requirements of a final product were subjected to dry mixing for 16 h using a dual-power mixer, and sieved by 300 mesh to obtain a mixed powder for later use;

(2): the mixed powder prepared in step (1) was placed into a molybdenum boat to allow high-temperature reduction under a reducing hydrogen atmosphere at 750° C. with a hydrogen flow rate of 20 m³/h and a powder spreading height that was ½ of a volume of the molybdenum boat for 20 h, and a resulting reduced powder was mixed with 4,000 g of a coarse-grained Mo powder in the dual-power mixer for 16 h to obtain a precursor powder;

(3): a suitable cladding material was selected according to a size of the final product, and the cladding material was subjected to ultrasonic cleaning and preheating before filling with a powder; where the ultrasonic cleaning was conducted at 50° C. for 30 min; and the preheating referred to heating the cladding material in the muffle furnace at 550° C. for 30 min, and then cooling with the muffle furnace;

(4): the cladding material treated in step (3) was filled with a certain amount of the precursor powder obtained in step (2) while conducting vibration at an amplitude of 3 mm and a vibration frequency of 320 times/min for 25 min, upper and lower parts of the cladding material were sealed, edges of the cladding material were welded, and gas tightness was checked;

(5): a precursor powder-filled cladding material was heated in a muffle furnace to 550° C. to remove possible water of crystallization, and high-temperature degassing was conducted for 16 h using a vacuum evacuation system; an air extraction port of the cladding material was scaled and welded by argon arc welding when a vacuum degree in the cladding material reached $1\times10^{-3}$ Pa, and then hot-pressed sintering was conducted at 1,800° C. for 5 h to obtain a sintered molybdenum alloy; where a microstructure of the sintered molybdenum alloy included molybdenum grains and nano-$TiC_{0.67}$ particles that were evenly distributed in the sintered molybdenum alloy; and the molybdenum grains had a particle size of 15 μm to 20 μm, while the nano-$TiC_{0.67}$ particles had an average particle size of 50 nm to 200 nm;

(6): the sintered molybdenum alloy obtained in step (5) was heated to a temperature of 1,250° C. and the temperature was held for 45 min under a reducing atmosphere of hydrogen with a flow rate of 6 m³/h, and then thermoplastic processing was conducted to obtain a molybdenum alloy billet; where the thermoplastic processing was rolling; and the thermoplastic processing had a total number of passes of 4 times, a deformation in each pass of 30%, and a total deformation of greater than or equal to 76%; and (7): the molybdenum alloy billet obtained poor step (6) was annealed at 900° C. for 60 min under a reducing atmosphere of hydrogen with a flow rate of 6 m³/h to obtain a high-density and high-toughness molybdenum alloy with a density of 99.7%, a grain size of 6 μm to 8 μm, and a recrystallization temperature of 1,600° C.

The mechanical properties at room temperature and high-temperature compressive strength of the molybdenum alloy were tested using the method of Example 1. The high-strength and high-toughness molybdenum alloy obtained in this example had a room-temperature tensile strength of 1,290 MPa, an elongation of 57.6%, and a high-temperature compressive strength of 275 MPa at 1,400° C., which were increased by 174.5%, 64.6%, and 129.2% compared to those of pure molybdenum metal, respectively.

Figure 3:
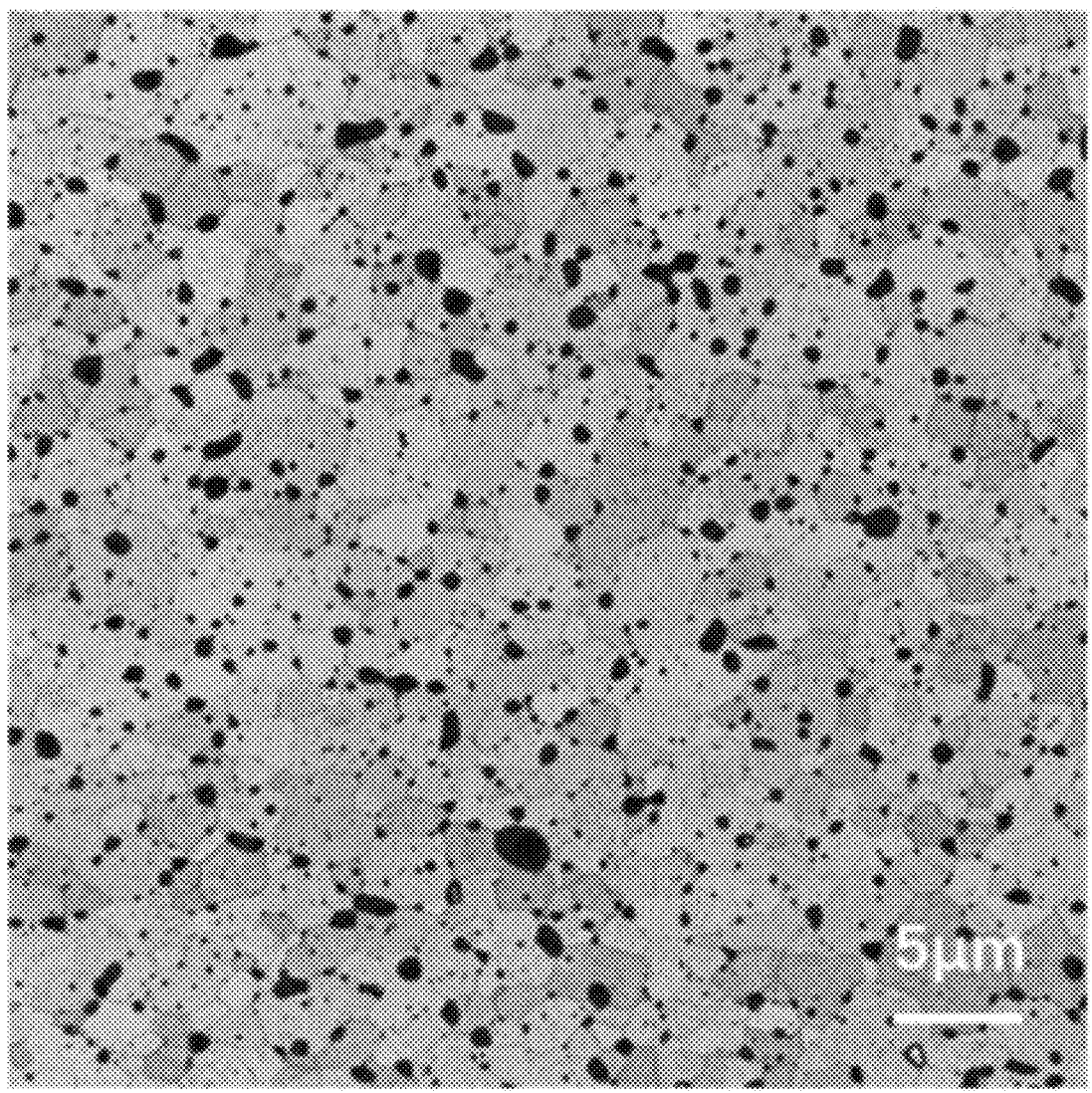
FIG. 3 shows a metallographic image of the high-strength and high-toughness molybdenum alloy prepared in Example 2 under an optical microscope.

FIG. 3 showed structure morphology of the high-strength and high-toughness molybdenum alloy prepared in this example (a metallographic image under optical microscope). The molybdenum grains had an average particle size of 6 μm to 8 μm; larger secondary phases were evenly distributed at the grain boundaries, while finer secondary phases were evenly distributed inside the grains.

Example 3

(1): 2,666 g of a molybdenum dioxide ($MoO_2$) powder and 50 g of a $Ti_3AlC_2$ powder according to requirements of a final product were subjected to dry mixing for 16 h using a dual-power mixer, and sieved by 300 mesh to obtain a mixed powder for later use;

(2): the mixed powder prepared in step (1) was placed into a molybdenum boat to allow high-temperature reduction under a reducing hydrogen atmosphere at 1,000° C. with a hydrogen flow rate of 18 m³/h and a powder spreading height that was ⅘ of a volume of the molybdenum boat for 16 h, and a resulting reduced powder was mixed with 3,000 g of a coarse-grained Mo powder in the dual-power mixer for 14 h to obtain a precursor powder;

(3): a suitable cladding material was selected according to a size of the final product, and the cladding material was subjected to ultrasonic cleaning and preheating before filling with a powder; where the ultrasonic cleaning was conducted at 40° C. for 40 min; and the preheating referred to heating the cladding material in the muffle furnace at 550° C. for 1 h, and then cooling with the muffle furnace;

(4): the cladding material treated in step (3) was filled with a certain amount of the precursor powder obtained in step (2) while conducting vibration at an amplitude of 3 mm and a vibration frequency of 320 times/min for 25 min, upper and lower parts of the cladding material were sealed, edges of the cladding material were welded, and gas tightness was checked;

(5): a precursor powder-filled cladding material was heated in a muffle furnace to 650° C. to remove possible water of crystallization, and high-temperature degassing was conducted for 16 h using a vacuum evacuation system; an air extraction port of the cladding material was sealed and welded by argon arc welding when a vacuum degree in the cladding material reached $1\times10^{-3}$ Pa to $1\times10^{-5}$ Pa, and then hot-pressed sintering was conducted at 1,400° C. for 6 h to obtain a sintered molybdenum alloy; where a microstructure of the sintered molybdenum alloy included molybdenum grains and nano-$TiC_{0.67}$ particles that were evenly distributed in the sintered molybdenum alloy; and the molybdenum grains had a particle size of 5 μm to 10 μm, while the nano-$TiC_{0.67}$ particles had an average particle size of 50 nm to 200 nm;

(6): the sintered molybdenum alloy obtained in step (5) was heated to a temperature of 1,350° C. and the temperature was held for 60 min under a reducing atmosphere of hydrogen with a flow rate of 7 m³/h, and then thermoplastic processing was conducted to obtain a molybdenum alloy billet; where the thermoplastic processing was rolling; and the thermoplastic processing had a total number of passes of 6 times, a deformation in each pass of 30%, and a total deformation of greater than or equal to 88.23%; and (7): the molybdenum alloy billet obtained poor step (6) was annealed at 1,300° C. for 50 min under a reducing atmosphere of hydrogen with a flow rate of 7 m³/h to obtain a high-density and high-toughness molybdenum alloy with a density of 99.9%, a grain size of 1 μm to 3 μm, and a recrystallization temperature of 1,600° C.

The mechanical properties at room temperature and high-temperature compressive strength of the molybdenum alloy were tested using the method of Example 1. The high-strength and high-toughness molybdenum alloy obtained in this example had a room-temperature tensile strength of 1,050 MPa, an elongation of 55.8%, and a high-temperature compressive strength of 301 MPa at 1,400° C., which were increased by 123.4%, 59.4%, and 150.8% compared to those of pure molybdenum metal, respectively.

Figure 4:
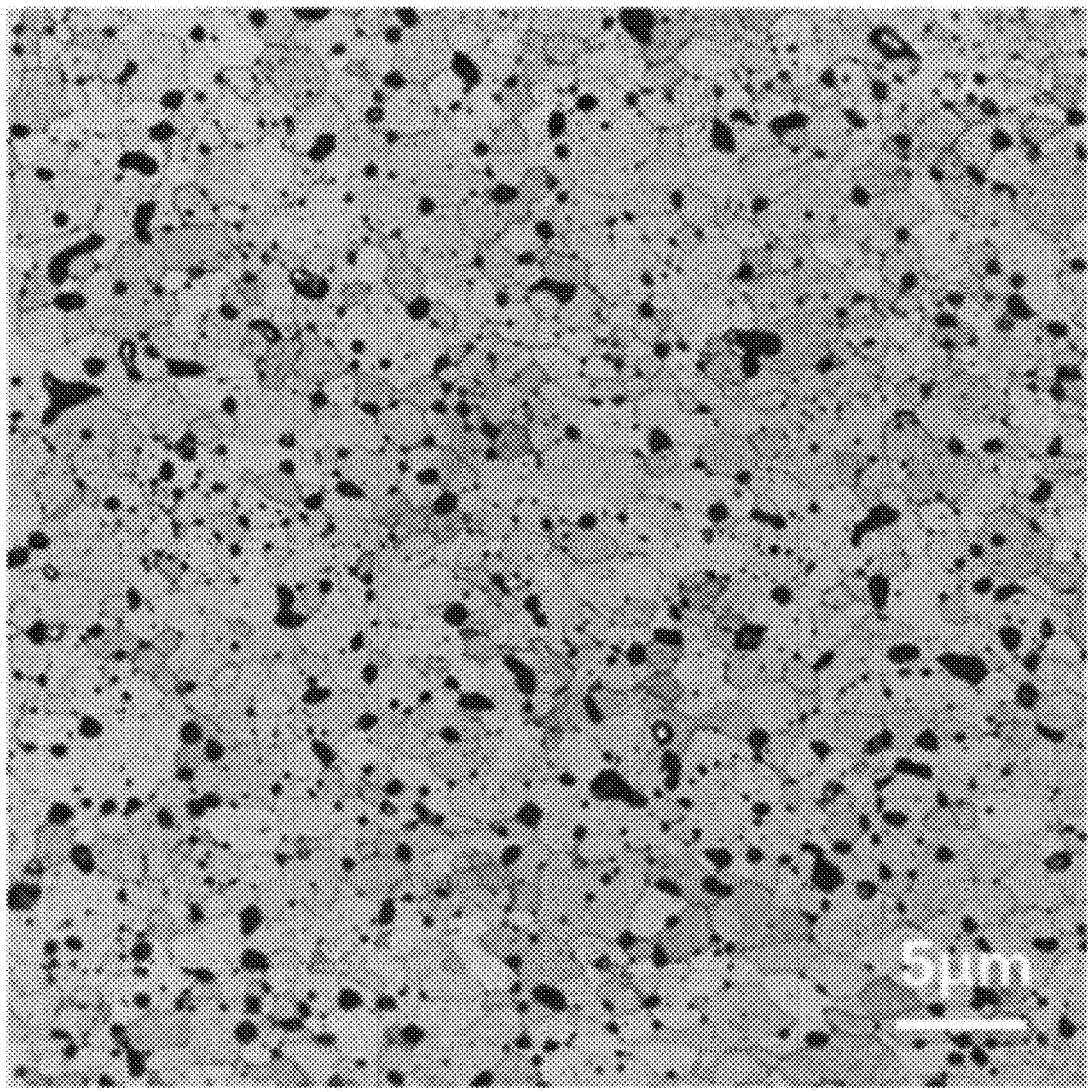
FIG. 4 shows a metallographic image of the high-strength and high-toughness molybdenum alloy prepared in Example 3 under an optical microscope.

FIG. 4 showed structure morphology of the high-strength and high-toughness molybdenum alloy prepared in this example (a metallographic image under optical microscope). The molybdenum grains had an average particle size of 1 μm to 3 μm; larger secondary phases were evenly distributed at the grain boundaries, while finer secondary phases were evenly distributed inside the grains.

Comparative Example 1

The reduced powder in step (2) was no longer mixed with coarse-grained molybdenum powder, but directly used as the precursor powder, the processes of step (3) to step (7) were conducted, while other steps were the same as those in Example 1 to obtain a molybdenum alloy product. The density and particle size of the prepared molybdenum alloy were tested according to the test method of Example 1, where the density was 98.5%, and the particle size of the molybdenum grains was 10 μm to 20 μm. The nano-$TiC_{0.67}$ particles evenly distributed inside the molybdenum grains had an average particle size of 0.5 μm to 3 μm. The molybdenum alloy obtained in this comparative example had a room-temperature tensile strength of 820 MPa, an elongation of 49.8%, and a high-temperature compressive strength of 199 MPa at 1,400° C. Comparison between the comparative example and the examples illustrated that by mixing the reduced powder with coarse-grained molybdenum powder and then conducting subsequent processes, the prepared molybdenum alloy had a smaller size of molybdenum grains and a higher density.

Figure 5:
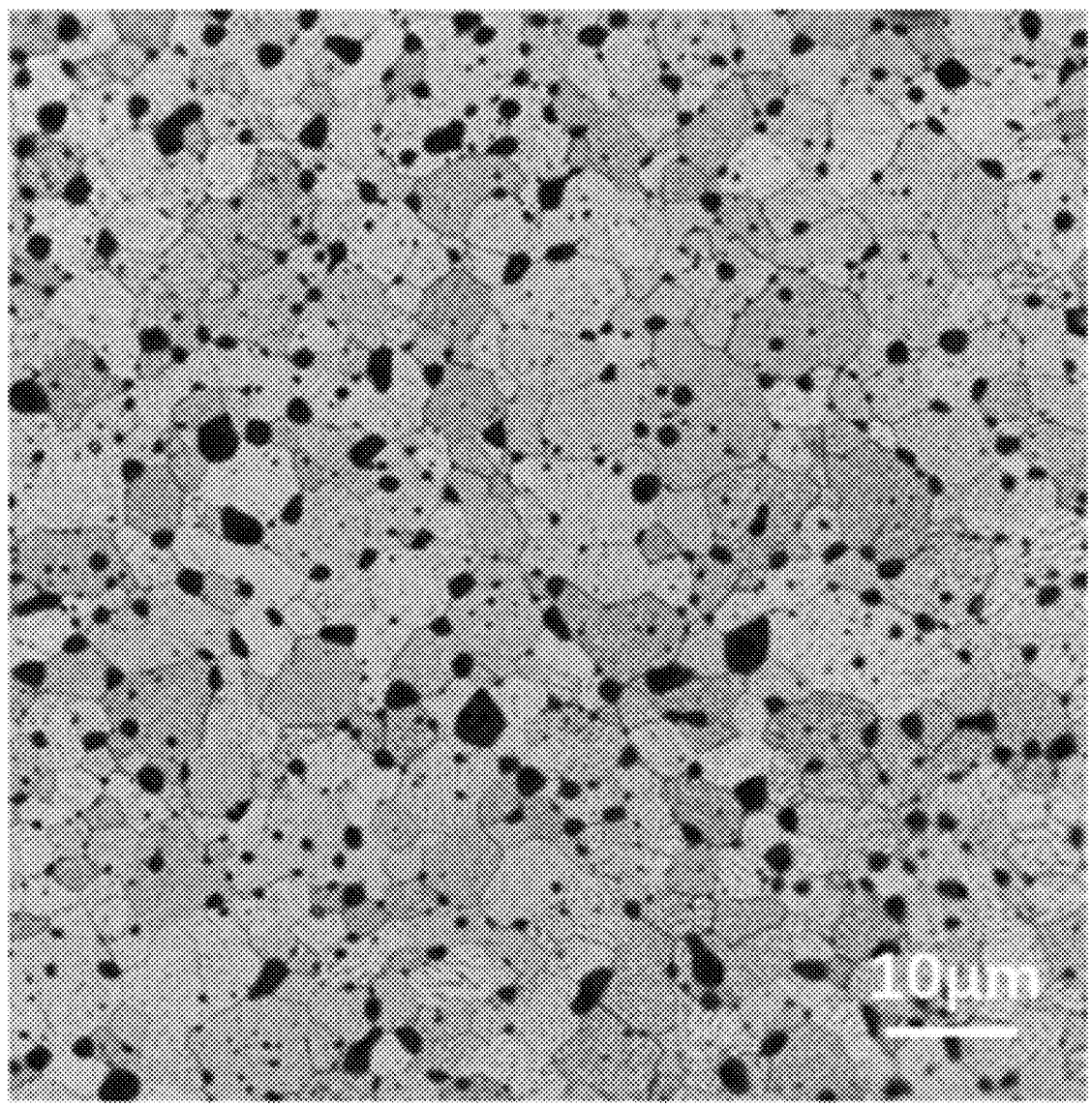
FIG. 5 shows a metallographic image of the molybdenum alloy prepared in a comparative example under an optical microscope.

FIG. 5 shows the structure morphology of the molybdenum alloy prepared in the comparative example (a metallographic image under optical microscope). The crystal grains had an average particle size of 10 μm to 20 μm.

Figure 6:
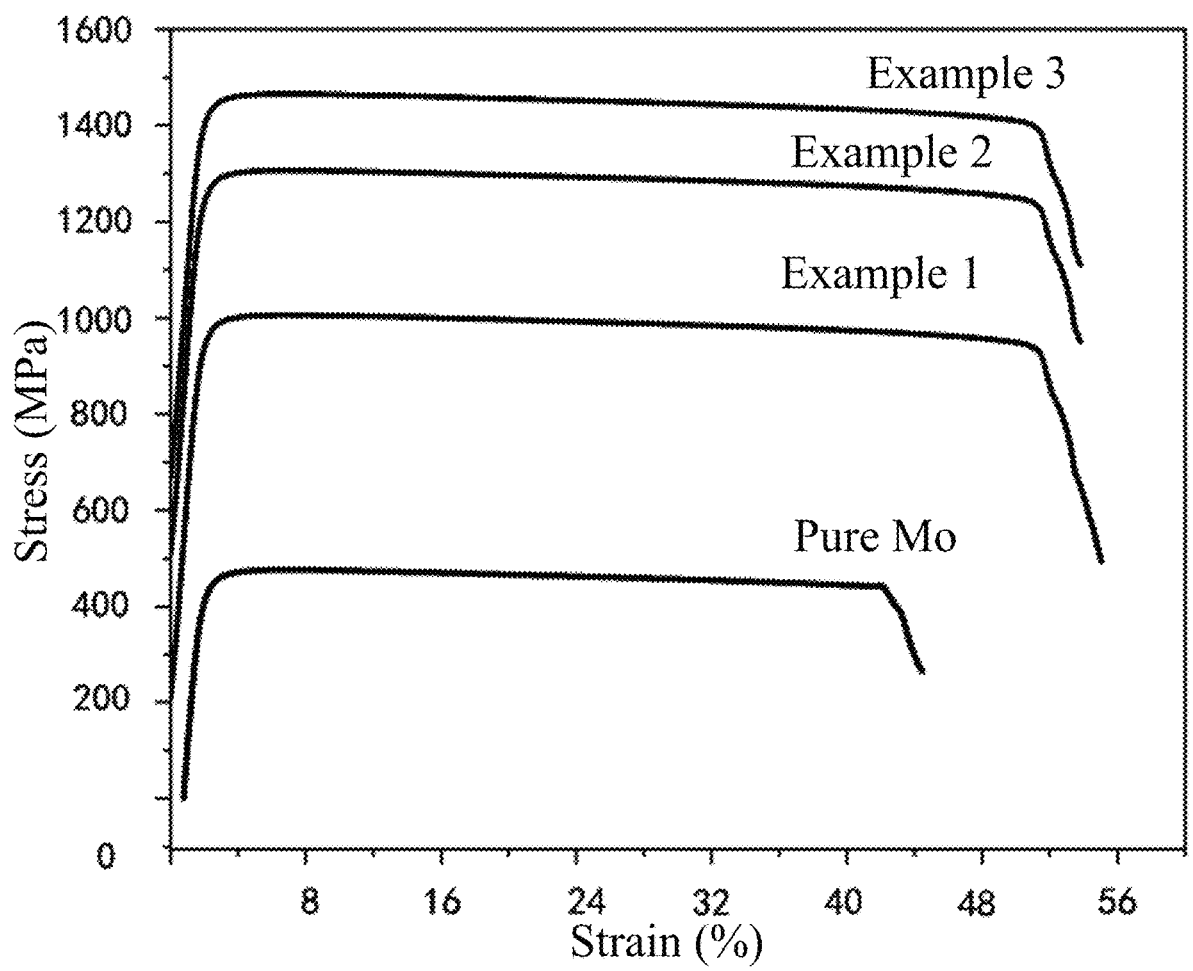
FIG. 6 shows stress-strain curves of the high-strength and high-toughness molybdenum alloys obtained in Examples 1 to 3 and pure molybdenum.

FIG. 6 showed stress-strain curves of the high-strength and high-toughness molybdenum alloys obtained in Examples 1 to 3 and pure molybdenum. The strengths of the molybdenum alloys obtained by different processes in the three examples were slightly different, but were overall higher than that of the pure molybdenum.

Figure 7:
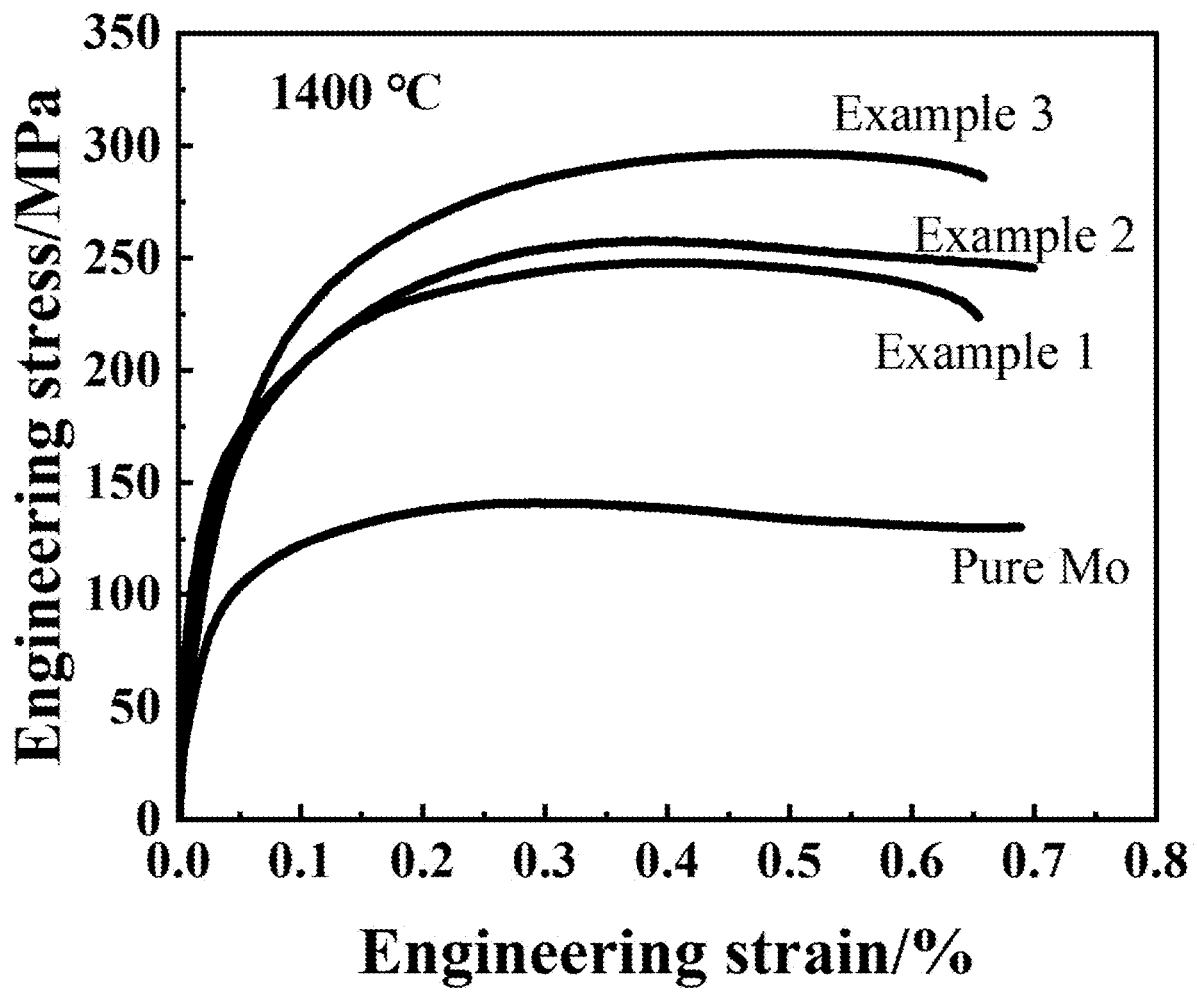
FIG. 7 shows high-temperature stress-strain curves of the high-strength and high-toughness molybdenum alloys obtained in Examples 1 to 3 and pure molybdenum at 1,400° C.

FIG. 7 showed high-temperature stress-strain curves of the high-strength and high-toughness molybdenum alloys obtained in Examples 1 to 3 and pure molybdenum at 1,400° C. The compressive strengths of the high-strength and high-toughness molybdenum alloys obtained in the three examples at 1,400° C. each were significantly higher than that of pure molybdenum.

The above are merely preferred examples of the present disclosure rather than limitations on the present disclosure in any form. The present disclosure can also have other forms of examples based on the above structures and functions, which will not be listed one by one. Therefore, any simple modifications, equivalent substitutions, equivalent changes, and modifications made to the above examples according to the technical essence of the present disclosure without departing from the contents of the technical solutions of the present disclosure still fall in the protection scope of the technical solutions of the present disclosure.

What is claimed is:

1. A preparation process of a $Ti_3AlC_2$ ceramic phase-toughened molybdenum alloy, comprising the following steps:
    (1): subjecting a certain amount of a molybdenum dioxide ($MoO_2$) powder and a $Ti_3AlC_2$ powder that are weighed according to requirements of a final product to dry mixing for 12 h to 32 h using a dual-power mixer, and sieving to obtain a mixed powder for later use;
    (2): placing the mixed powder prepared in step (1) into a molybdenum boat to allow high-temperature reduction under a reducing hydrogen atmosphere at 750° C. to 1,000° C. with a hydrogen flow rate of (12-20) $m^3/h$ and a powder spreading height that is less than or equal to ⅘ of a volume of the molybdenum boat for 6 h to 24 h, and mixing a resulting reduced $Ti_3AlC_2$ ceramic phase-containing powder with a commercial coarse-grained Mo powder at a certain proportion in the dual-power mixer for 10 h to 20 h to obtain a precursor powder;
    (3): selecting a suitable cladding material according to a size of the final product, and subjecting the cladding material to ultrasonic cleaning and preheating before filling with a powder;
    (4): filling the cladding material treated in step (3) with a certain amount of the precursor powder obtained in step (2) while conducting vibration, sealing upper and lower parts of the cladding material, welding edges of the cladding material, and checking gas tightness;
    (5): heating a precursor powder-filled cladding material in a muffle furnace to 500° C. to 600° C. to remove possible water of crystallization, and conducting high-temperature degassing for 8 h to 20 h using a vacuum evacuation system; sealing and welding an air extraction port of the cladding material by argon arc welding when a vacuum degree in the cladding material reaches $1\times10^{-3}$ Pa to $1\times10^{-5}$ Pa, and then conducting hot-pressed sintering to obtain a sintered molybdenum alloy;
    (6): heating the sintered molybdenum alloy obtained in step (5) to a temperature of 1,200° C. to 1,600° C. and holding the temperature for 30 min to 60 min under a protective atmosphere with a flow rate of (5-15) $m^3/h$, and then conducting thermoplastic processing to obtain a molybdenum alloy billet; and
    (7): annealing the molybdenum alloy billet obtained in step (6) under a protective atmosphere to obtain a high-density and high-toughness molybdenum alloy.

2. The preparation process of a $Ti_3AlC_2$ ceramic phase-toughened molybdenum alloy according to claim 1, wherein the $Ti_3AlC_2$ powder has a lamellar structure, a purity of not less than 99%, and a particle size of 2 μm to 10 μm, and the molybdenum dioxide powder has a particle size of 8 μm to 20 μm and an impurity potassium content of 5 ppm to 10 ppm in step (1); and the commercial coarse-grained Mo powder has a particle size of 3 μm to 8 μm in step (2).

3. The preparation process of a $Ti_3AlC_2$ ceramic phase-toughened molybdenum alloy according to claim 1, wherein the ultrasonic cleaning is conducted at 30° C. to 60° C. for 30 min to 60 min; and the preheating refers to heating the cladding material in the muffle furnace at 500° C. to 600° C. for 1 h to 2 h, and then cooling with the muffle furnace in step (3).

4. The preparation process of a $Ti_3AlC_2$ ceramic phase-toughened molybdenum alloy according to claim 1, wherein the vibration in step (4) is conducted at an amplitude of 3 mm to 5 mm and a vibration frequency of 280 times/min to 350 times/min for 15 min to 30 min.

5. The preparation process of a $Ti_3AlC_2$ ceramic phase-toughened molybdenum alloy according to claim 1, wherein the hot-pressed sintering in step (5) is conducted at 1,300° C. to 1,900° C. for 4 h to 10 h; a microstructure of the sintered molybdenum alloy comprises molybdenum grains and nano-$TiC_{0.67}$ particles that are evenly distributed in the sintered molybdenum alloy; and the molybdenum grains have a particle size of 5 μm to 20 μm, while the nano-$TiC_{0.67}$ particles have an average particle size of 50 nm to 200 nm.

6. The preparation process of a $Ti_3AlC_2$ ceramic phase-toughened molybdenum alloy according to claim 1, wherein the thermoplastic processing in step (6) is one or a combination of two or more selected from the group consisting of rotary forging, rolling, extrusion, and drawing; and the thermoplastic processing has a cogging temperature of 1,300° C. to 1,600° C., a total number of passes of 2 to 6 times, a deformation in each pass of 20% to 30%, and a total deformation of greater than or equal to 70%.

7. The preparation process of a $Ti_3AlC_2$ ceramic phase-toughened molybdenum alloy according to claim 1, wherein the annealing in step (7) is conducted at 900° C. to 1,600° C. for 40 min to 200 min.

8. The preparation process of a $Ti_3AlC_2$ ceramic phase-toughened molybdenum alloy according to claim 1, wherein the protective atmosphere is a hydrogen atmosphere.

9. The preparation process of a $Ti_3AlC_2$ ceramic phase-toughened molybdenum alloy according to claim 1, wherein the high-density and high-toughness molybdenum alloy prepared in step (7) has a density of not less than 99.5% and a particle size of 1 μm to 8 μm.

10. The preparation process of a $Ti_3AlC_2$ ceramic phase-toughened molybdenum alloy according to claim 2, wherein the high-density and high-toughness molybdenum alloy prepared in step (7) has a density of not less than 99.5% and a particle size of 1 μm to 8 μm.

11. The preparation process of a $Ti_3AlC_2$ ceramic phase-toughened molybdenum alloy according to claim 3, wherein the high-density and high-toughness molybdenum alloy prepared in step (7) has a density of not less than 99.5% and a particle size of 1 μm to 8 μm.

12. The preparation process of a $Ti_3AlC_2$ ceramic phase-toughened molybdenum alloy according to claim 4, wherein the high-density and high-toughness molybdenum alloy prepared in step (7) has a density of not less than 99.5% and a particle size of 1 μm to 8 μm.

13. The preparation process of a $Ti_3AlC_2$ ceramic phase-toughened molybdenum alloy according to claim 5, wherein the high-density and high-toughness molybdenum alloy prepared in step (7) has a density of not less than 99.5% and a particle size of 1 µm to 8 µm.

14. The preparation process of a $Ti_3AlC_2$ ceramic phase-toughened molybdenum alloy according to claim 6, wherein the high-density and high-toughness molybdenum alloy prepared in step (7) has a density of not less than 99.5% and a particle size of 1 µm to 8 µm.

15. The preparation process of a $Ti_3AlC_2$ ceramic phase-toughened molybdenum alloy according to claim 7, wherein the high-density and high-toughness molybdenum alloy prepared in step (7) has a density of not less than 99.5% and a particle size of 1 µm to 8 µm.

16. The preparation process of a $Ti_3AlC_2$ ceramic phase-toughened molybdenum alloy according to claim 8, wherein the high-density and high-toughness molybdenum alloy prepared in step (7) has a density of not less than 99.5% and a particle size of 1 µm to 8 µm.

17. The preparation process of a $Ti_3AlC_2$ ceramic phase-toughened molybdenum alloy according to claim 1, wherein the high-density and high-toughness molybdenum alloy prepared in step (7) has a room-temperature tensile strength of greater than 1,000 MPa, an elongation of greater than 50%, and a 1,400° C. compressive strength of greater than 240 MPa.

18. The preparation process of a $Ti_3AlC_2$ ceramic phase-toughened molybdenum alloy according to claim 2, wherein the high-density and high-toughness molybdenum alloy prepared in step (7) has a room-temperature tensile strength of greater than 1,000 MPa, an elongation of greater than 50%, and a 1,400° C. compressive strength of greater than 240 MPa.

19. The preparation process of a $Ti_3AlC_2$ ceramic phase-toughened molybdenum alloy according to claim 3, wherein the high-density and high-toughness molybdenum alloy prepared in step (7) has a room-temperature tensile strength of greater than 1,000 MPa, an elongation of greater than 50%, and a 1,400° C. compressive strength of greater than 240 MPa.

20. The preparation process of a $Ti_3AlC_2$ ceramic phase-toughened molybdenum alloy according to claim 4, wherein the high-density and high-toughness molybdenum alloy prepared in step (7) has a room-temperature tensile strength of greater than 1,000 MPa, an elongation of greater than 50%, and a 1,400° C. compressive strength of greater than 240 MPa.

* * * * *